No. 889,891. PATENTED JUNE 9, 1908.
P. McN. BENNIE.
METHOD OF PREPARING CARBON ARTICLES.
APPLICATION FILED JULY 11, 1907.

Witnesses
E. B. Gilchrist
H. R. Sullivan

Inventor
Peter McN. Bennie
by
Thurston & Woodward
Attys

UNITED STATES PATENT OFFICE.

PETER McN. BENNIE, OF NIAGARA FALLS, NEW YORK, ASSIGNOR TO NATIONAL CARBON COMPANY, A CORPORATION OF NEW JERSEY.

METHOD OF PREPARING CARBON ARTICLES.

No. 889,891.  Specification of Letters Patent.  Patented June 9, 1908.

Application filed July 11, 1907. Serial No. 383,219.

*To all whom it may concern:*

Be it known that I, PETER McN. BENNIE, a citizen of the United States, residing at Niagara Falls, in the county of Niagara and State of New York, have invented a certain new and useful Improvement in Methods of Preparing Carbon Articles, of which the following is a full, clear, and exact description.

The object of the present invention is to provide an improvement in the art of preparing carbon articles for machining.

More particularly, my invention is directed to preparing articles of hard, amorphous carbon for machining, in such manner that the difficulties attendant upon the machining process will be eliminated while the carbons will retain such desirable qualities as they originally possess, particularly a high thermal resistance and sufficient physical strength to withstand uses to which they are subjected.

As is well known to those familiar with carbons, the ordinary article of amorphous carbon is difficult to machine, especially where any delicacy of shape or form is desired in the finished product, owing to the hardness and the brittleness of the material upon which the tool operates. I have, however, discovered a method whereby a hard carbon article may be machined with accuracy and precision without losing that high thermal resistance and strength which characterizes the hard carbon articles.

The invention may be broadly stated to comprise the process of locally softening the article in those parts or paths in which the machining tool is to operate, without substantially affecting that portion of the material which is to form the finished article.

Figure 1:
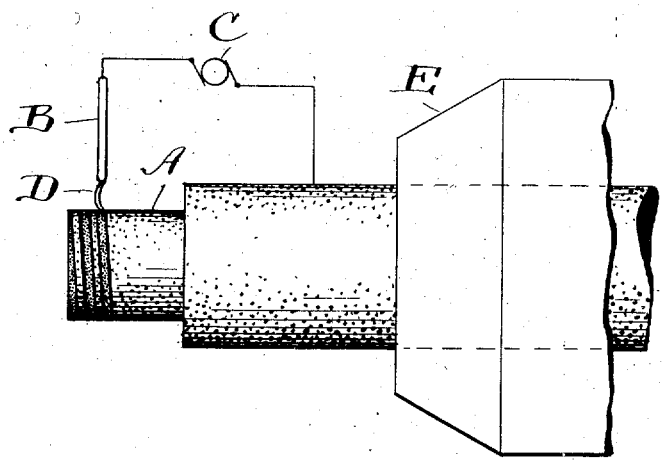
Figure 2:
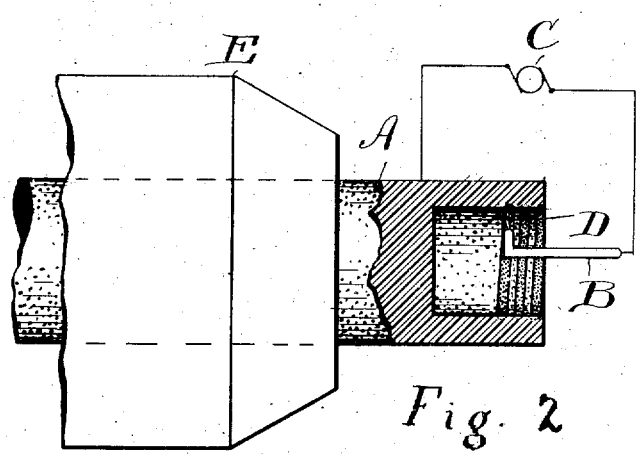

One method of practicing my invention may be understood from the specification to follow, reference being had to the accompanying drawings in which Figure 1 diagraphically illustrates the procedure of forming a screw thread upon a carbon core. Fig. 2 diagraphically illustrates the method of preparing a carbon with a female screw thread.

In practicing my invention, I prefer to cause an arc to play upon the surface of the hard amorphous carbon article from a stationary electrode and to manipulate the carbon article and present it to the stationary electrode in such manner that the arc shall locally soften or graphitize the hard amorphous carbon in those portions or parts which it is desired to remove. For example, in the drawings, where it is desired to form screw threads on the hard amorphous carbon blank A, I provide a stationary electrode B connected with one terminal of a source of electric current, C, while the carbon article itself is connected to the other terminal. An arc D is drawn between the stationary electrode and the carbon article which is preferably held in a movable socket or chuck E of any sort capable of having the desired path and rate of movement for presenting the carbon article to the electrode in such manner that the arc will be applied to those parts or portions which it is desired to soften and subsequently remove. Thus, by feeding the chuck or holder of the amorphous carbon article in the proper direction and at the required rate which may be controlled by a suitable lead-screw, or in any other manner, the graphitizing arc may be caused to follow the exact helical path of the groove which it is necessary to cut in the carbon in order to form the desired thread thereon. If the value of the current be properly regulated the softening or graphitization will be sufficient and confined to the desired localities. The carbon may thereafter be put in a lathe and the cutting tool controlled to remove the graphitized material, which may readily be done, while the remaining material, being still in a hard amorphous condition, will possess substantially the original high thermal resistance and physical strength which was present in the original article. It is to be seen, however, that it is within the scope of my invention to have the cutting tool mounted in such manner that it shall operate immediately after and follow in the path of the electric arc so that the operations of softening, or graphitizing, and machining are substantially simultaneous.

The formation of the female screw thread shown in Fig. 2 does not differ in principle, of course, from the process outlined in Fig. 1,— it being merely necessary that the arrangement of the parts be different so as to correspond to the difference in form of the article under treatment.

This process is not limited to the formation of screw threads or to the production of any particular form, it being clear that the invention is applicable to any form which it is desired to produce. It is further obvious that it is not necessary to rely upon the electric arc as the source of the heat necessary for softening or graphitization, as other means may be employed. For example, the temperature required may be reached by bringing a carbon electrode into contact with the carbon article under treatment, at those points where it is desired to produce the effect, and passing a sufficiently heavy current therethrough.

Having thus described my invention, I claim:

1. The method of shaping hard carbon articles, which comprises the step of locally softening the articles in those portions where the material is to be removed for the production of the finished form.

2. The method of shaping hard carbon articles which comprises as a step the local application of softening or graphitizing conditions to the parts or portions of the article which it is desired to remove and removing such parts or portions.

3. The method of producing hard carbon shapes which consists in producing graphitizing conditions locally upon a hard carbon article and removing the material thus graphitized.

4. The method of preparing hard carbon articles for machining, which comprises drawing an electric arc to the surface of said article along the path which is to be subsequently cut away.

5. The method of preparing hard carbon articles for shaping which comprises softening the portion to be cut away by high heat produced by the electric current.

6. The method of treating hard carbon articles by drawing an electric arc from a fixed electrode to the carbon article to be prepared, and in moving said article so as to cause said arc to follow and be substantially confined to that portion which it is necessary to remove.

7. A carbon article substantially consisting of hard carbon which has been locally softened in those parts or portions the removal of which is necessary for the production of the finished form.

8. An article of hard carbon which has been locally softened and machined, cut, or ground in the softened part.

In testimony whereof, I hereunto affix my signature in the presence of two witnesses.

PETER McN. BENNIE.

Witnesses:
MARY E. JAMES,
FRANCIS A. J. FITZGERALD.